United States Patent
Ishizuka (10) Patent No.: US 7,554,704 B2
(45) Date of Patent: Jun. 30, 2009

(54) IMAGE SCANNING APPARATUS HAVING A SCANNING POSITION ADJUSTMENT CAPABILITY

(75) Inventor: Daisuke Ishizuka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 716 days.

(21) Appl. No.: 10/763,165

(22) Filed: Jan. 26, 2004

(65) Prior Publication Data

US 2004/0160648 A1 Aug. 19, 2004

(30) Foreign Application Priority Data

Jan. 31, 2003 (JP) ............... 2003-023919
Jul. 28, 2003 (JP) ............... 2003-280794

(51) Int. Cl.
 *H04N 1/04* (2006.01)
(52) U.S. Cl. ...................... 358/487; 358/474
(58) Field of Classification Search .............. 358/474, 358/487
 See application file for complete search history.

(56) References Cited

U.S. PATENT DOCUMENTS

| 4,831,412 A |   | 5/1989 | Ohnishi et al. ............. 355/233 |
| 5,239,392 A | * | 8/1993 | Suzuki et al. ............. 358/474 |
| 5,341,225 A | * | 8/1994 | Stein et al. ............... 358/498 |
| 6,005,688 A | * | 12/1999 | Hsieh et al. ............... 358/504 |
| 6,094,512 A |   | 7/2000 | Lin et al. .................. 382/315 |
| 6,236,770 B1 | * | 5/2001 | Hsieh et al. ............... 382/312 |
| 7,006,260 B2 |   | 2/2006 | Sato et al. ................. 358/448 |
| 2002/0054715 A1 |   | 5/2002 | Os et al. ................... 382/276 |

FOREIGN PATENT DOCUMENTS

| EP | 0 905 969 | 3/1999 |
| JP | 62-166373 | 7/1987 |
| JP | 4-358469 | 12/1992 |
| JP | 8-22087 | 1/1996 |
| JP | 2708877 | 2/1998 |
| JP | 11-252322 | 9/1999 |
| JP | 2001-8002 | 1/2001 |
| JP | 2002-244949 | 8/2002 |

* cited by examiner

*Primary Examiner*—Douglas Q Tran
(74) *Attorney, Agent, or Firm*—Fitzpatrick, Cella, Harper & Scinto (57) ABSTRACT

An image scanning apparatus is capable of successively scanning a plurality of documents arranged on a document plate in an efficient manner by moving a sensor unit over the documents in a sub-scanning direction. When the plurality of documents arranged on the document plate is scanned, the motion of the sensor unit is selectively controlled in such a manner that after completion of scanning one document, the sensor unit is returned to its home position before starting scanning a next document, the sensor unit is temporarily stopped before starting scanning the next document, or the sensor unit is moved backward by a particular distance before starting scanning the next document.

9 Claims, 12 Drawing Sheets

IMAGE SCANNING APPARATUS HAVING A SCANNING POSITION ADJUSTMENT CAPABILITY

BACKGROUND OF THE INVENTION

1. Field of the Invention

The present invention relates to an image scanning apparatus, such as a scanner or a copier, having a scanning position adjustment capability.

2. Description of the Related Art

In recent years, personal computers have become very popular, and drastic improvements in performance and capabilities have been achieved. As a result, it has become possible for personal computers to perform processing requiring high power, such as editing full color images or optical character recognition (OCR). Thus, many people, including those having no special knowledge or skill, use flatbed image scanners.

Many photographic images are stored in an electronic manner such that electric image data are produced by scanning printed pictures or negative films and the resultant electric image data are stored in the form of image files or electronic albums on a hard disk or the like. The stored electric image data are then read and used, as required, from the hard disk. To meet a need for image scanners suitable for the above purpose, flatbed image scanners have been developed which have the capability of easily scanning a plurality of printed pictures or a plurality of frames of a film in a successive manner. A specific example of such a flatbed image scanner is disclosed, for example, in Japanese Patent Laid-Open No. 2001-8002.

However, in those scanners, a carriage is returned to its home position (waiting position) each time one printed picture or one frame of a film is scanned. As a result, the carriage has to move back and forth between the home position and a printed picture or a frame of a film each time scanning is performed. This is very inefficient and requires a significant amount of time.

SUMMARY OF THE INVENTION

An object of the present invention is to provide a technique of successively scanning a plurality of document images in an efficient manner.

In one aspect, the present invention provides an image scanning apparatus including an image sensing unit that scans a document image while moving relative to the document image. The image scanning apparatus further includes a controller that controls the relative motion between the image sensing unit and the document image such that when a plurality of document images are scanned, the relative motion is temporarily stopped after completion of scanning one document image and before starting scanning of a next document image.

In another aspect, the present invention provides an image scanning apparatus including an image sensing unit that scans a document image while moving relative to the document image. The image scanning apparatus further includes a controller that controls the relative motion between the image sensing unit and the document image such that when a plurality of document images are scanned, the image sensing unit is moved relatively backwardly by a particular distance after completion of scanning one document image and before starting scanning of a next document image.

In another aspect, the present invention provides an image scanning apparatus including an image sensing unit that scans a document image while moving relative to the document image. The image scanning apparatus further includes a controller that controls the relative motion between the image sensing unit and the document image such that when a plurality of document images are scanned, the relative motion is controlled so as to scan the plurality of document images in an order that minimizes the total distance of the relative motion.

In another aspect, the present invention provides a control program for controlling an image scanning apparatus. The program includes the steps of scanning a document image while moving an image sensing unit relative to the document image. The control program also includes the step of controlling the relative motion between the image sensing unit and the document image such that when a plurality of document images are scanned, the relative motion is temporarily stopped after completion of scanning one document image and before starting scanning of a next document image.

In another aspect, the present invention provides a control program for controlling an image scanning apparatus. The program includes the step of scanning a document image while moving an image sensing unit relative to the document image. The control program also includes the step of controlling the relative motion between the image sensing unit and the document image such that when a plurality of document images are scanned, the image sensing unit is moved relatively backwardly by a particular distance after completion of scanning one document image and before starting scanning of a next document image.

In another aspect, the present invention provides a control program for controlling an image scanning apparatus. The control program includes the step of scanning a document image while moving an image scanning unit relative to the document image. The control program also includes the step of controlling the relative motion between the image sensing unit and the document image such that when a plurality of document images are scanned, the relative motion is controlled so as to scan the plurality of document images in an order that minimizes the total distance of the relative motion.

The image scanning apparatus and the control program thereof in any aspect of the present invention make it possible to successively scan a plurality of document images arranged on the image scanning apparatus in an efficient manner.

Other objects and features of the present invention will be apparent from the following descriptions and the accompanying drawings. In the figures like reference characters designate the same or similar parts.

DESCRIPTION OF THE PREFERRED EMBODIMENTS

First Embodiment

Embodiments of the present invention are described below with reference to the accompanying drawings.

Figure 1:
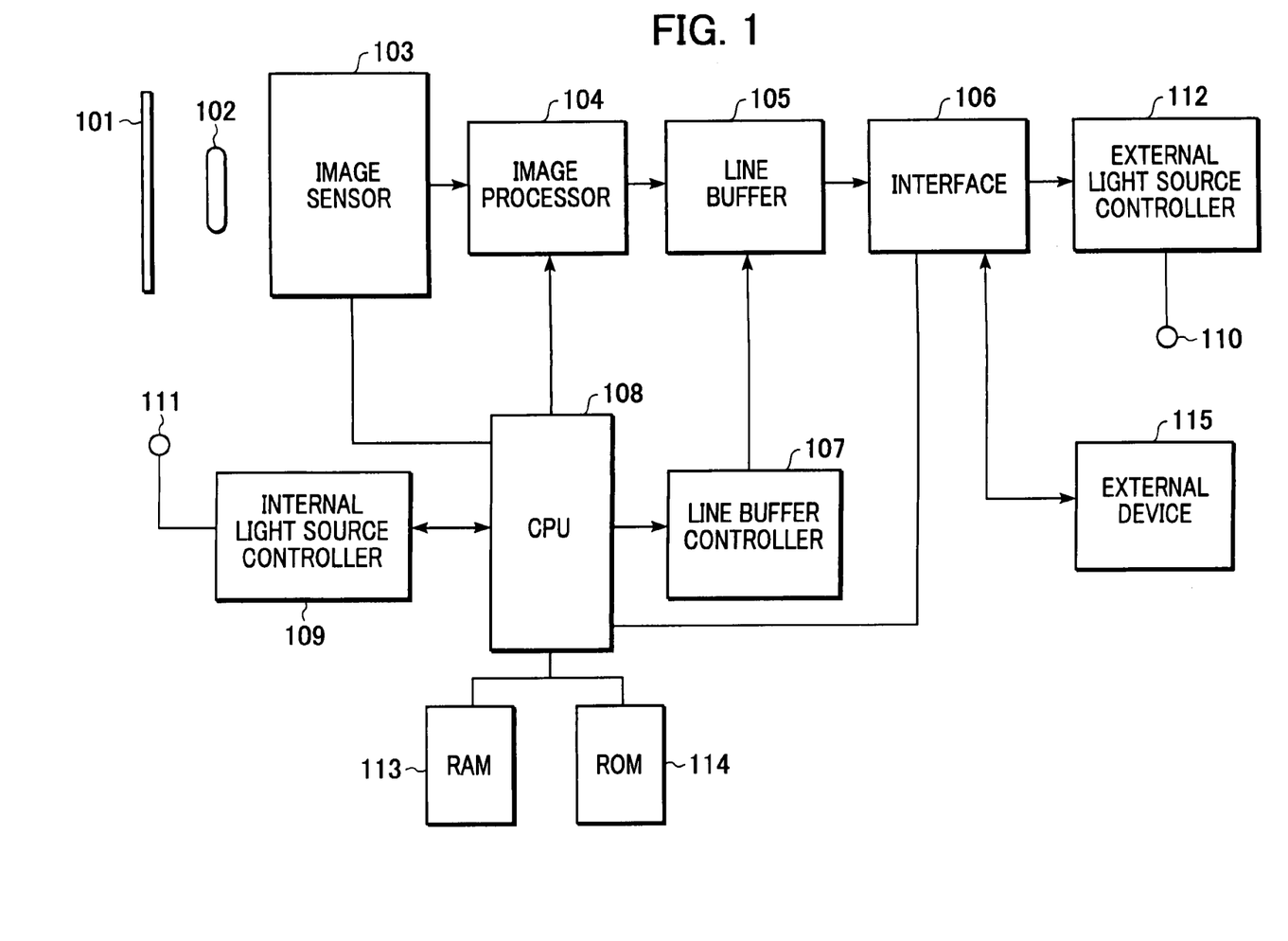
FIG. 1 is a diagram showing the construction of an image scanning apparatus according to an embodiment of the present invention.

FIG. 1 is a diagram showing a construction of an image scanner that is an example of an image scanning apparatus according to an embodiment of the present invention. In FIG. 1, reference numeral 101 denotes a document, 102 denotes a lens, and 103 denotes an image sensor for converting an image formed by the lens 102 into an electrical signal.

Reference numeral 104 denotes an image processing circuit for generating a 2-level image signal from an image signal output by the image sensor 103. Reference numeral 105 denotes a line buffer. Reference numeral 106 denotes an interface for communication with an external device 115 and an external light source controller 112. Reference numeral 107 denotes a line buffer controller for controlling the line buffer 105 for each color light source.

Reference numeral 108 denotes a CPU (Central Processing Unit), 113 denotes a RAM (Random Access Memory), and 114 denotes a ROM (Read Only Memory), whereby a line number is designated and the line buffer controller 107 transmits data to the external device 115 via the interface 106. The RAM 113 is used to temporarily store image data acquired via scanning. In the ROM 114, control programs such as a scanning control program are stored, wherein control means according to the present invention is implemented by executing the control programs using the CPU 108.

Reference numeral 109 denotes an internal light source controller and reference numeral 111 denotes an internal light source. The internal light source controller 109 controls turning on/off the internal light source 111, and controls the amount of light emitted by the internal light source 111. Reference numeral 110 denotes an external light source for illuminating a transparent film, and reference numeral 112 denotes an external light source controller. Reference numeral 115 denotes an external device such as a computer connected to the interface 106. An image acquired by the image scanning apparatus is transferred to the external device 115.

Figure 2:
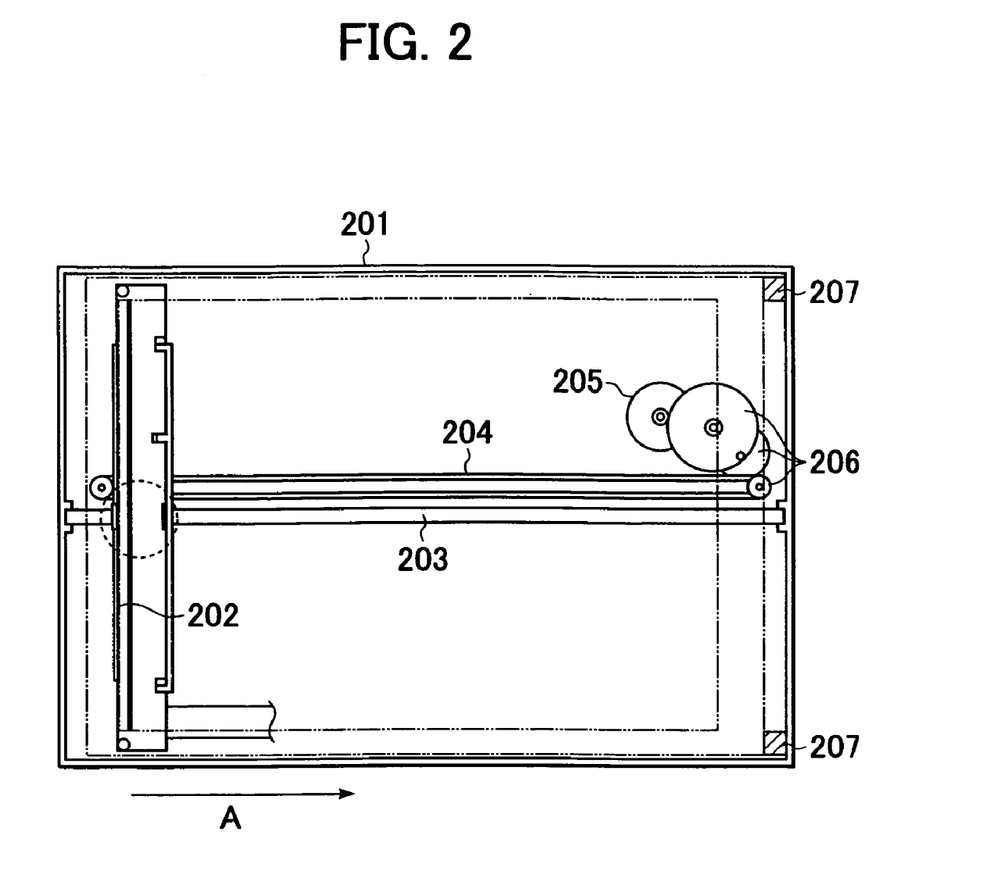
FIG. 2 is a plan view of a flatbed image scanner.

FIG. 2 is a plan view of a flatbed image scanner. In FIG. 2, reference numeral 201 denotes a scanner frame, and reference numeral 202 denotes a sensor unit including the image sensor 103, disposed on a carriage. In this embodiment, the sensor unit 202 serves as the image sensing means according to the present invention.

Reference numeral 203 denotes a reference shaft along which the sensor unit 202 is driven in a sub-scanning direction denoted by arrow A. Reference numeral 204 denotes a driving belt connected to the sensor unit 202 for driving the sensor unit 202 along the reference shaft 203, 205 denotes a stepping motor, and 206 denotes a set of gears for transmitting the driving force from the stepping motor 205 to the driving belt 204. Reference numeral 207 denotes fixing holes into which bars protruding from a hinge of the transparent film adaptor are inserted to firmly place the transparent film adaptor on the image scanner.

If the CPU 108 receives a scan command from the external device 115, the CPU 108 drives the stepping motor 205 to move the driving belt 204 via the set of gears 206 such that the sensor unit 202 moves in the sub-scanning direction along the reference shaft 203. In this manner, a film image placed on the glass plate in the scanner frame 201 is scanned.

Figure 3:
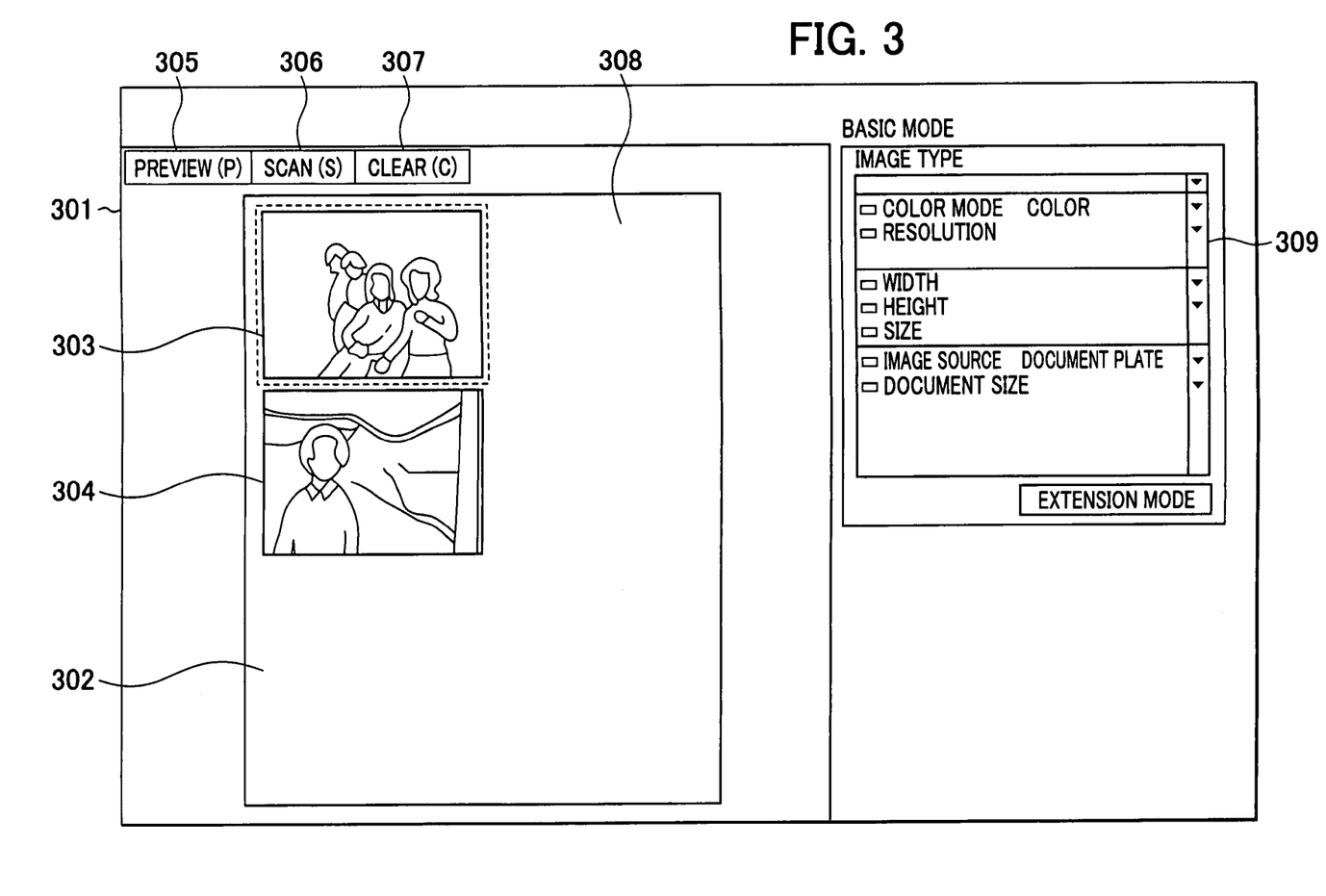
FIG. 3 is a diagram showing an example of an operation control screen of an image scanning apparatus according to an embodiment of the present invention.
Figure 4:
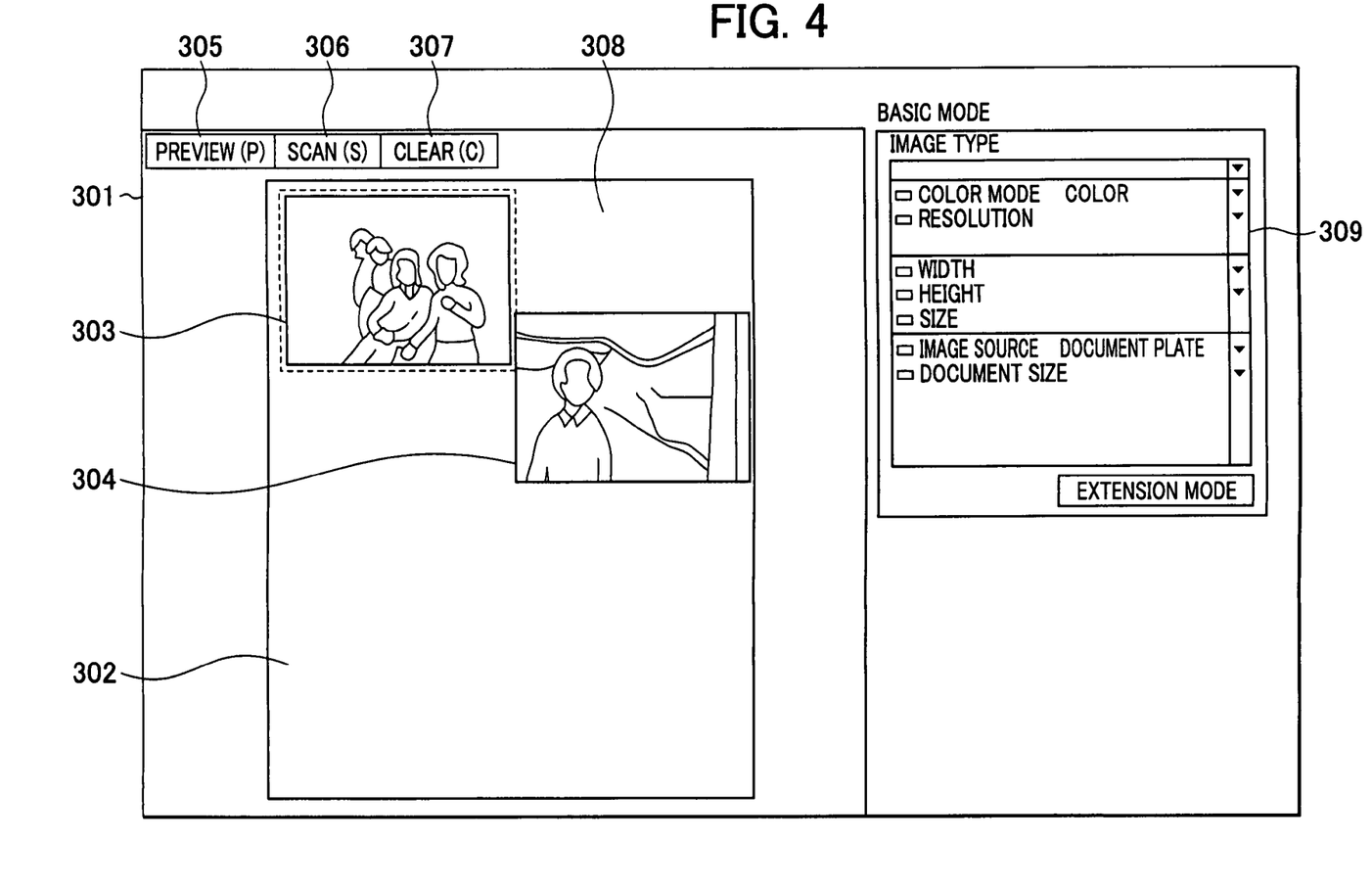
FIG. 4 is a diagram showing another example of an operation control screen of an image scanning apparatus according to an embodiment of the present invention.
Figure 5:
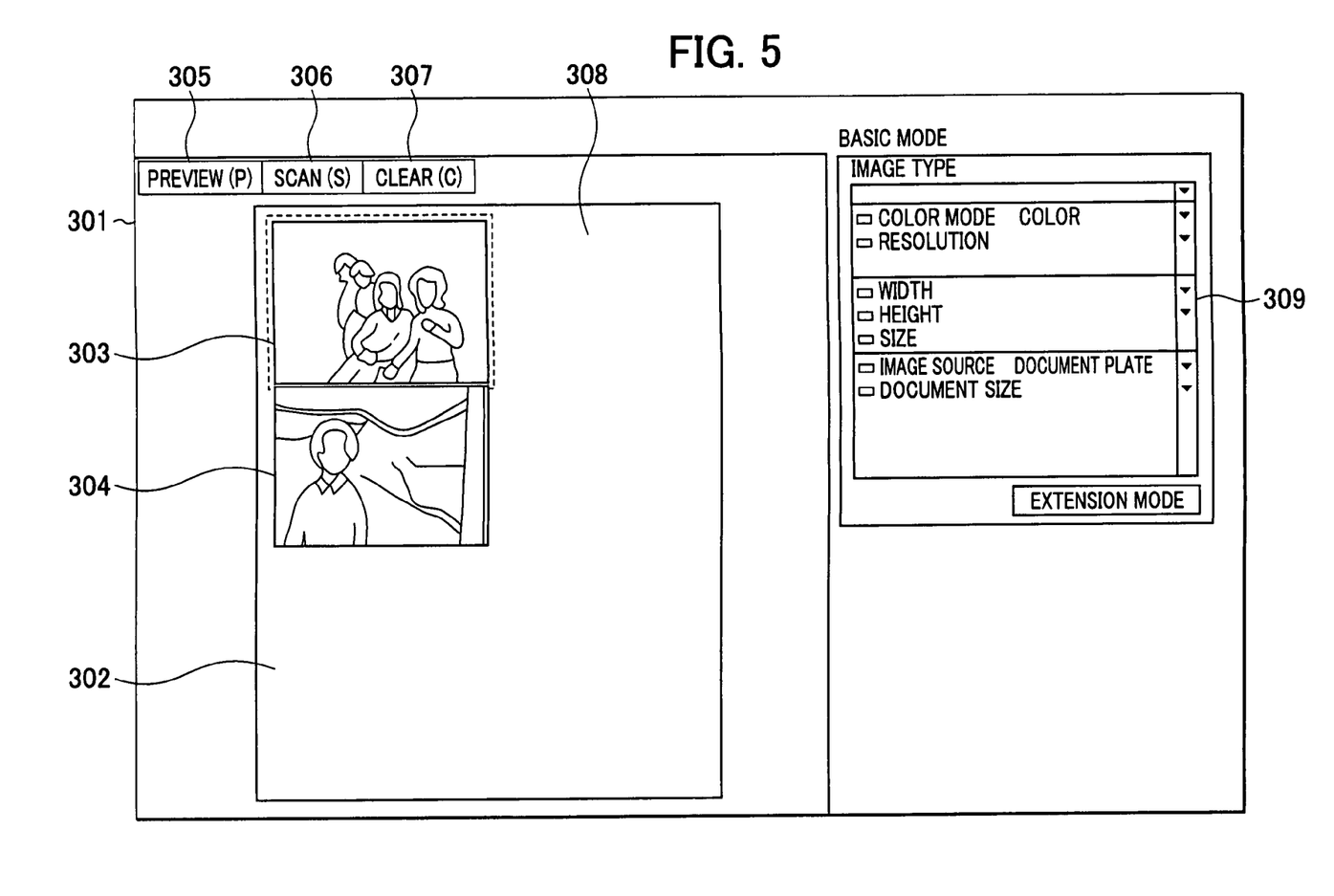
FIG. 5 is a diagram showing another example of an operation control screen of an image scanning apparatus according to an embodiment of the present invention.

FIGS. 3 to 5 show examples of operation control screens of the image scanning apparatus according to the present embodiment, wherein each operation control screen is displayed on a display of the computer serving as the external device 115. In those figures, reference numeral 301 denotes an operation control window, 302 denotes a preview window, 303 and 304 denote images obtained by scanning a film placed on the glass plate of the image scanning apparatus, 305 denotes a preview button, 306 denotes a scan button, and 307 denotes a clear button for deleting images in the preview window.

Reference numeral 308 denotes a crop area that is defined within the preview window 302 to specify frames to be scanned. In the present scanner, a plurality of frames can be selected. Reference numeral 309 denotes a set of parameters that specify a scanning mode in which the selected frames are scanned. Using a setting button in another window, a user can specify whether calibration is performed each time a frame is scanned.

Figure 11:
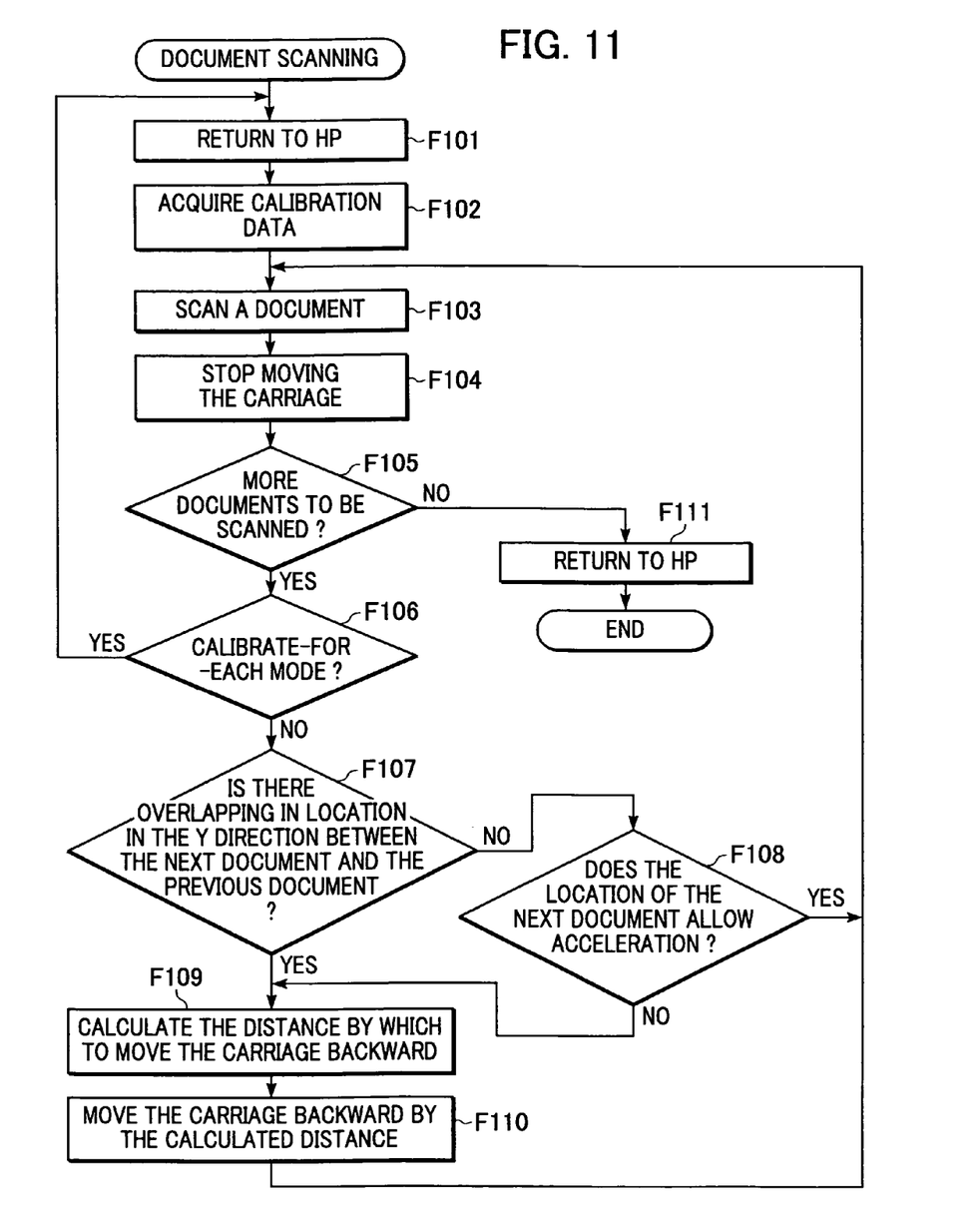
FIG. 11 is a flow chart showing a process of scanning a document.

Referring to a flow chart shown in FIG. 11, a process of scanning images is described below. First, a carriage is returned to its home position (step F101), and calibration data are acquired (step F102). In the calibration step, a white reference plate is scanned, and obtained data are stored as calibration data. After completion of acquiring the calibration data, a document is scanned (step F103). In this scanning process, image data obtained by scanning the document are processed on the basis of the calibration data.

After completion of scanning one document, the carriage is temporarily stopped (step F104). Thereafter, it is determined whether there are one or more additional documents to be scanned (step F105). If there are no more documents to be scanned, the carriage is returned to its home position (step F111), and the scanning process is ended.

If there are additional documents to be scanned, it is determined whether the current operation mode requires that calibration be performed each time a document is scanned (step F106). If calibration for each document is specified in the current operation mode, the process returns to step F101 (to return the carriage to its home position to acquire calibration data and then start scanning a next document).

If calibration for each document is not specified in the current operation mode, however, it is determined whether there is overlapping in location in the Y direction (sub-scanning direction) between the next document and the previous document (step F107).

If there is no such overlapping, it is further determined whether the distance between the previous document and the next document is large enough to accelerate the carriage to a speed at which to scan the next document (step F108). If the distance is large enough, the process proceeds to step F103 and scanning of the document is started.

If there is overlapping in location in the Y direction between the previous document and the next document, or if the distance between the previous document and the next document is not large enough to accelerate the carriage to the scanning speed, the distance by which to move the carriage backward is calculated (step F109), and the carriage is moved backward by the calculated distance (step F110). Thereafter, the process returns to step F103 to start scanning of the next document.

In step F109 described above, the distance is calculated in accordance with the following equations.

When there is overlapping in location in the $Y$ direction: Distance by which to move the carriage backward=current $Y$ coordinate−$Y$ coordinate of the leading edge of the next document+distance needed for acceleration When there is no overlapping in location in the $Y$ direction: Distance by which to move the carriage backward=distance needed for acceleration−space between documents (if this value is equal to 0, it is not necessary to move the carriage backward)

The scanning speed is controlled as follows.

For a resolution of 2400 dpi, one line corresponds to one pulse, and scanning time per line is 22.2 msec. Therefore, the scanning time per line for each resolution is given as follows.

75 dpi: 32 pulses 1333 pulses/sec
150 dpi: 16 pulses 667 pulses/sec
300 dpi: 8 pulses 333 pulses/sec
600 dpi: 4 pulses 167 pulses/sec
1200 dpi: 2 pulses 83 pulses/sec
2400 dpi: 1 pulse 41.7 pulses/sec From the above values, the minimum distance needed to accelerate the carriage to the scanning speed can be calculated. The motor needs a starting range equal to 300 pulses/sec, and thus acceleration is necessary for resolutions less than 300 dpi. Also an additional acceleration table of 20 mm including a margin is necessary. In accordance with those values, the distance by which to move the carriage backward is calculated.

Referring to FIGS. 3 through 5, the manner of controlling the motion of the carriage to scan a plurality of documents is described for exemplary ways in which documents are placed on the document glass plate. In the example shown in FIG. 3, two documents (pictures) 303 and 304 are placed such that there is no overlapping in location in the sub-scanning direction and such that they are spaced from each other by a sufficient distance. In this case, if it is not specified by a user to perform calibration each time a document (picture) is scanned, the carriage can be accelerated to the scanning speed between the documents (pictures) 303 and 304. Thus, when scanning of the first document (picture) 303 is completed, the carriage is stopped temporarily and scanning of the second document (picture) 304 is started from the position where the carriage is temporarily at rest.

On the other hand, in the case in which it is specified by a user to perform calibration each time a document (picture) is scanned, the carriage is returned to its home position without exception after the completion of scanning the first document (picture) 303, and calibration data are acquired. Thereafter, the operation of scanning the second document (picture) 304 is started.

In the example shown in FIG. 4, two documents (pictures) 303 and 304 are placed such that there is overlapping in location in the sub-scanning direction. In this case, if it is not specified by a user to perform calibration each time a document (picture) is scanned, the distance needed to accelerate the carriage to the scanning speed before the carriage arrives at a position from which reading of the next document (picture) 304 is started must be calculated. When scanning the first document (picture) 303 is completed, the carriage is stopped temporarily and is then moved backward by the calculated distance. Operation of scanning the second document (picture) 304 is started from the position to which the carriage is moved backward.

On the other hand, in the case in which it is specified by a user to perform calibration each time a document (picture) is scanned, the carriage is returned to its home position without exception after the completion of scanning the first document (picture) 303, and calibration data are acquired. Thereafter, scanning of the second document (picture) 304 is started.

In the example shown in FIG. 5, two documents (pictures) 303 and 304 are placed such that they are in direct contact with each other although they do not overlap in the sub-scanning direction. In this case, there is an insufficient amount of space between the position at which reading of the first document (picture) 303 is ended and the position at which reading of the second document (picture) 304 is started. Thus, if it is not specified by a user to perform calibration each time a document (picture) is scanned, the distance needed to accelerate the carriage to the scanning speed before starting reading the next document (picture) 304 is calculated. When scanning of the first document (picture) 303 is completed, the carriage is stopped temporarily and is then moved backward by the calculated distance. Scanning of the second document (picture) 304 is then started from the position to which the carriage has been moved backward.

On the other hand, in the case in which it is specified by a user to perform calibration each time a document (picture) is scanned, the carriage is returned to its home position without exception after the completion of scanning the first document (picture) 303, and calibration data are acquired. Thereafter, the operation of scanning the second document (picture) 304 is started.

In the operation of scanning a plurality of documents (pictures) according to the present embodiment, as described above, movement of the carriage is limited, and thus it is possible to scan a plurality of documents (pictures) in a very short period of time.

Second Embodiment

It is possible to scan an image formed on a transparent film such as a photographic film, by using an external light source in conjunction with an image scanning apparatus configured in a manner similar to that used in the first embodiment.

Figure 6:
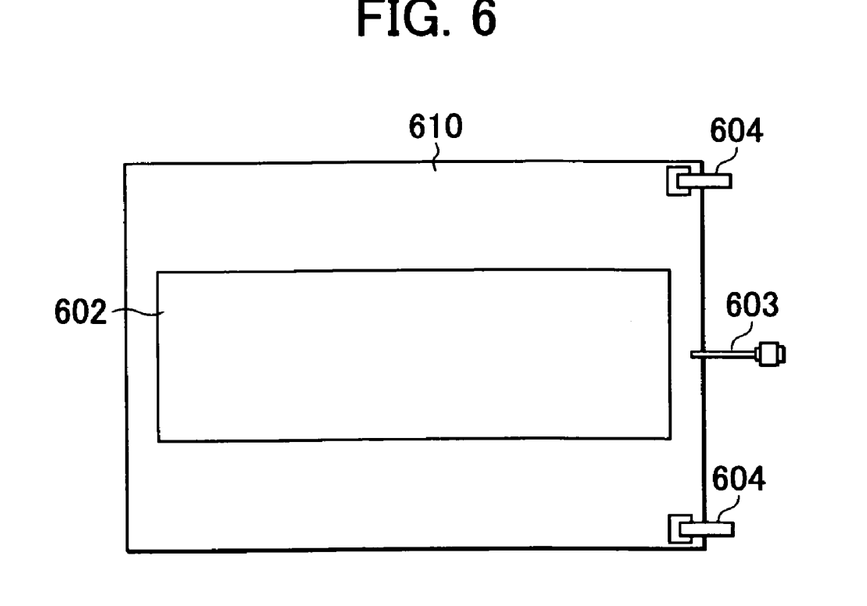
FIG. 6 is a bottom view of a transparent film illumination adaptor.

FIG. 6 is a diagram showing a transparent film illumination adaptor disposed on an image scanning apparatus; the view is from a side on which illumination light is incident. In FIG. 6, reference numeral 610 denotes a transparent film illumination adaptor, 602 denotes a light source for illuminating a film, 603 denotes a connector for connection with the image scanning apparatus, and 604 denotes right and left hinges for firmly placing the transparent film illumination adaptor on the image scanning apparatus.

Figure 7:
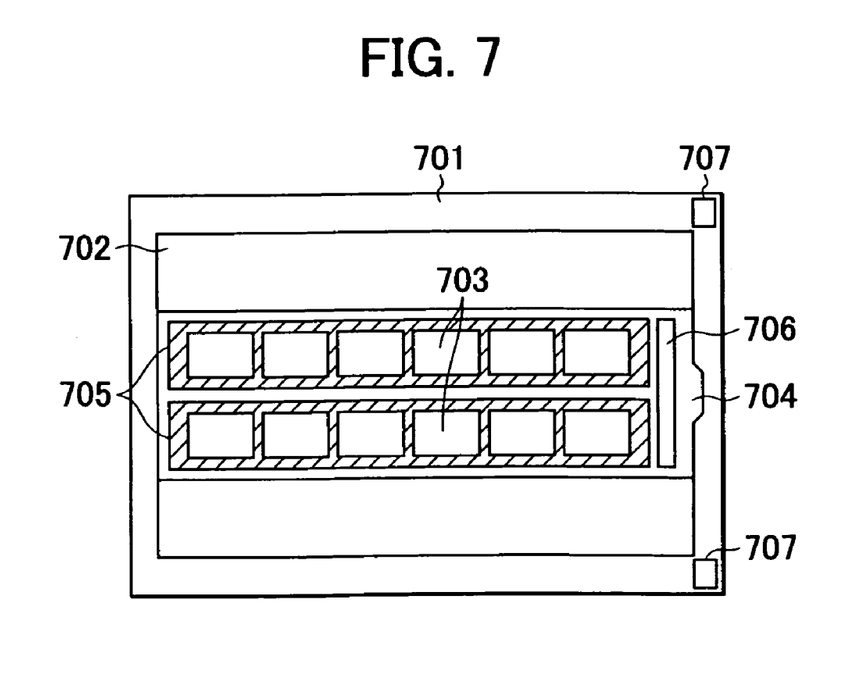
FIG. 7 is top view showing a document glass plate on which a film is placed.

FIG. 7 is a top view showing a document glass plate on which a film to be scanned is placed.

In FIG. 7, reference numeral 701 denotes the image scanning apparatus (scanner), 702 denotes a document glass plate, 703 denotes two films placed side by side on the document glass plate 702, 704 denotes a film guide for firmly supporting the films 703 on the document glass plate 702, 705 denotes a film holder for holing the films 703 on the film guide 704, 706 denotes a window for directly detecting the intensity of light emitted from the light source of the transparent film adaptor and adjusting the intensity of light, and 707 denotes fixing holes into which bars protruding from the respective hinges 604 of the transparent film adaptor 110 are inserted to firmly placing the transparent film adaptor 110 on the image scanning apparatus.

Light emitted from the transparent film illumination adaptor 610 passes through the films 703 and strikes the moving sensor unit 202, which detects the incident light. Two films may be placed on the film guide 704 such that one or both of the films is deviated from the normal position, if it is desired.

Figure 8:
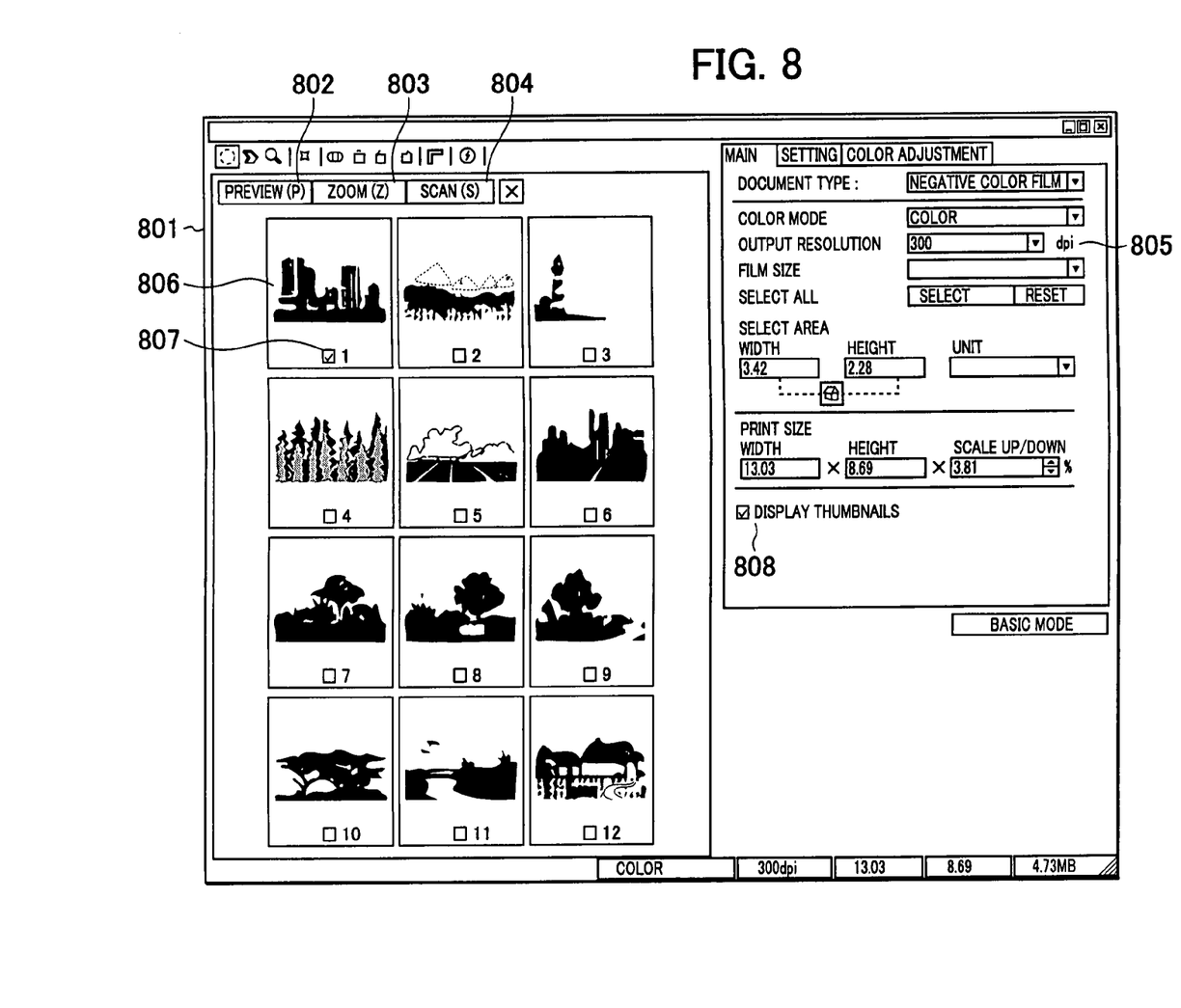
FIG. 8 is a diagram showing an example of an operation control screen of an image scanning apparatus according to an embodiment of the present invention.

FIG. 8 is a diagram showing an operation control screen that is displayed on a display of a computer (external device) 115 when a film is scanned using the image scanning apparatus. In the example of FIG. 8, preview images of film pictures are displayed in the form of thumbnails in accordance with original locations of film pictures. In a case in which films 703 are placed in normal positions on the film guide 704, high-precision thumbnail images are displayed.

In FIG. 8, reference numeral 801 denotes a scanner operation control window, 802 denotes a preview button, 803 denotes a zoom button for enlarging preview images, 804 denotes a scan button for scanning selected film pictures, 805 denotes a user interface for setting scanning conditions such as a color/monochrome mode, resolution, etc., 806 denotes a preview image of a film picture, and 807 denotes a check box for selecting a film picture to be scanned.

Reference numeral 808 denotes a thumbnail check box. If this thumbnail check box 808 is checked, thumbnail images corresponding to respective frame images are displayed separately. On the other hand, a single preview image including all frame images is displayed in the preview area when the thumbnail check box 808 is unchecked.

In the thumbnail mode, if the scan button 804 is pressed after selecting at least one check box 807, the frame image (picture) corresponding thereto is scanned at a time.

Figure 9:
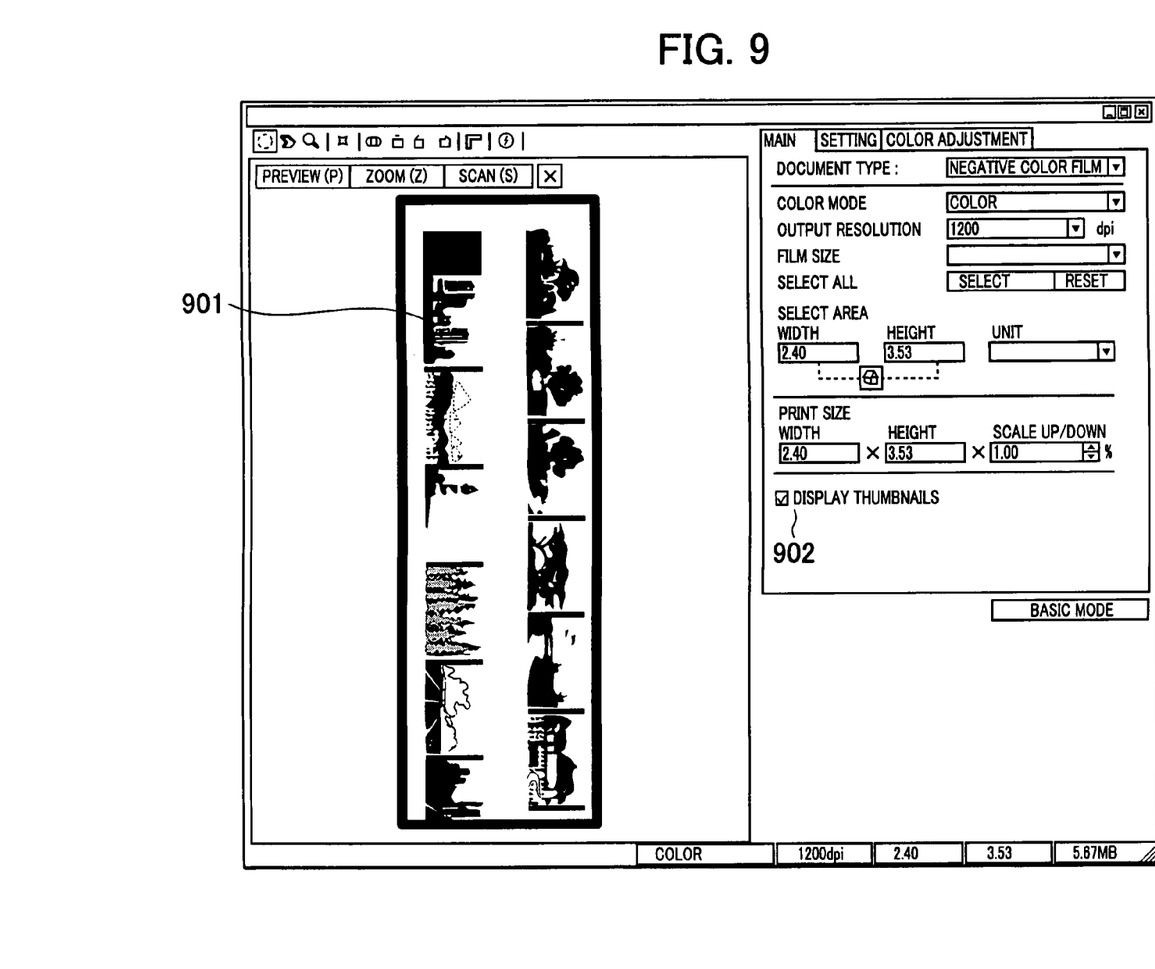
FIG. 9 is a diagram showing another example of an operation control screen of an image scanning apparatus according to an embodiment of the present invention.

FIG. 9 shows an operation control screen in which a single preview image including all frame images is displayed in the preview area. This operation control screen is used mainly to specify areas to be scanned when two films 703 are placed not in the normal positions on the film guide 704 but in arbitrary positions in which one or both of the two films 703 may be deviated from the normal positions in the sub-scanning direction.

In FIG. 9, reference numeral 901 denotes a crop frame for specifying an area to be scanned. By using a plurality of crop frames, it is possible to specify a plurality of pictures. If the scan button 804 is pressed after selecting film pictures, the selected film pictures are scanned at a time, as with the case discussed above with respect to FIG. 8. Reference numeral 902 denotes a thumbnail check box. If this thumbnail check box is checked, the screen is returned to the screen in the thumbnail mode.

A procedure of calculating an exposure time in scanning a film picture is described below.

In the film scanning operation, after the intensity of the external light source 110 is adjusted to a predetermined value, previewing is performed, and an intensity histogram is produced for each film picture. On the basis of the histogram, the amount of light needed for scanning is calculated. Furthermore, from the calculated amount of light needed for scanning, the exposure time per line is calculated. As a matter of course, the histogram may vary from a frame of a film to another, and, accordingly, the exposure time per line may be varied frame to frame.

More specifically, the necessary amount of light is determined such that an intensity level smaller by 10% than the highest intensity in the histogram corresponds to the 250th level of 255 scale levels. The exposure time per line determined in the above-described manner is fed back to the scanning reference signal, and the period of the motor control signal in synchronization with the scanning reference signal is calculated. After completion of setting those parameters, scanning is actually performed.

Figure 13A:
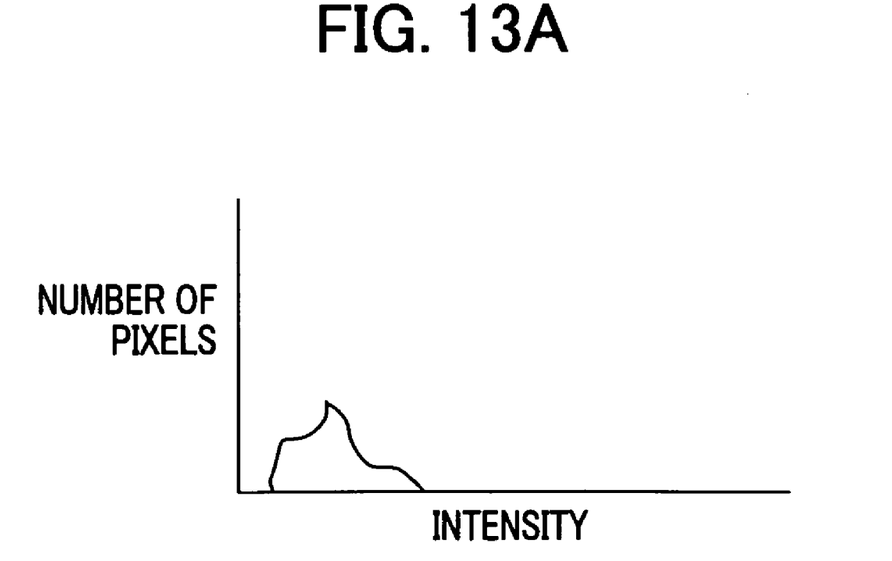
FIGS. 13A and 13B show histograms of a preview image.
Figure 13B:
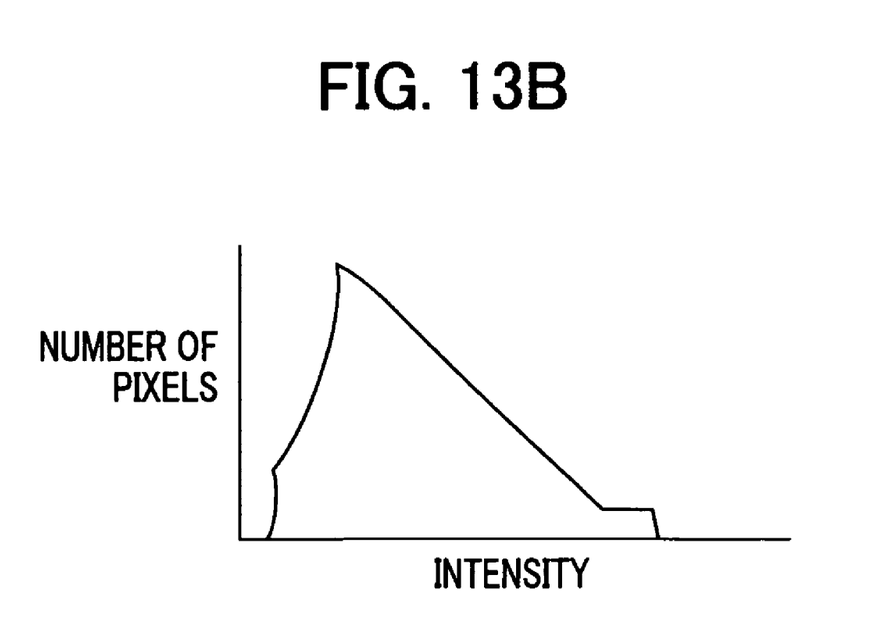

FIG. 13A shows an example of histogram data of an actual preview image, and FIG. 13B shows an example of histogram data corrected by means of the calculation described above. In the histogram data of the actual preview image, the intensity level smaller by 10% than the highest intensity corresponds approximately to the 100th level of 255 scale levels. However, in the actual scanning process, the exposure time is adjusted such that the above intensity level corresponds approximately to the 250th level of 255 scale levels. To achieve the above intensity level in the actual scanning process, the period of the scanning reference signal is multiplied by a factor of about 1.5.

The manner of placing films on the document glass plate and the operation control screen have been described above. When two transparent films are scanned, the motion of the carriage is controlled in a similar manner as when the reflective documents of the first embodiment were scanned. In particular, the motion depends on the relative positions of selected frames, some of which may overlap in the sub-scanning direction. The motion will be described below with reference to the flow chart shown in FIG. 11. Also in this embodiment, the motion of the carriage is selectively controlled in such a manner that the carriage is returned to its home position each time one frame is scanned, or in such a manner that the carriage is moved backward by a distance needed to accelerate the carriage to the scanning speed, or in such a manner that the carriage is moved to a next scanning position without being moved backward, whereby it is possible to scan a plurality of frames in an efficient manner.

The distance needed to accelerate the carriage to the scanning speed is determined with reference to 300 pulses/sec as in the first embodiment. If the carriage is needed to be moved at a speed higher than the above value, an acceleration table of 20 mm including a margin for stabilization after acceleration is needed. The determination as to whether the carriage is needed to be moved backward is performed on the basis of the above criterion.

Figure 12:
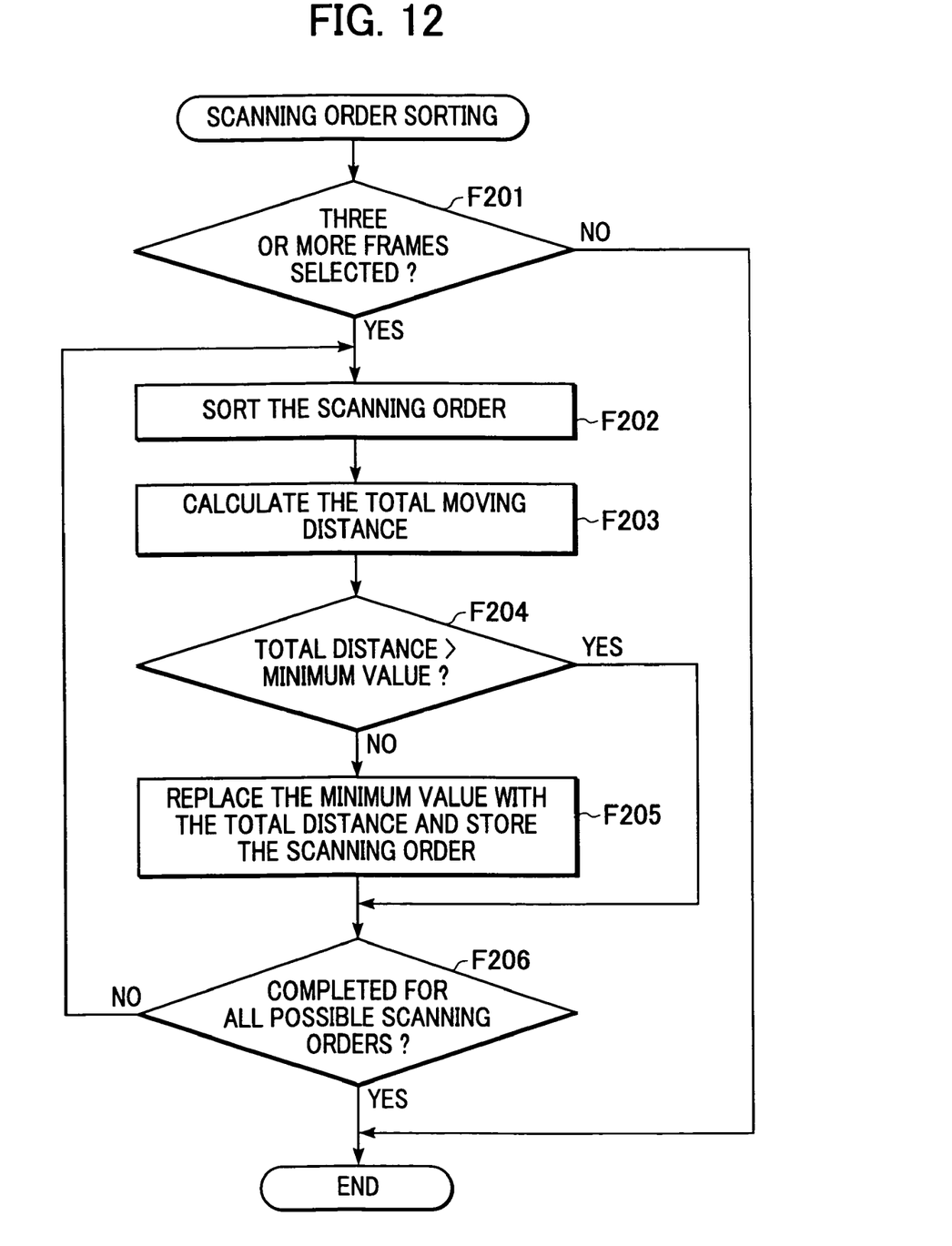
FIG. 12 is a flow chart showing a process of scanning a document.

Referring now to FIG. 12, the manner of selecting an optimum order in which to scan a plurality of selected frames of a film is described below.

First, it is determined whether three or more frames are selected to be scanned (step F201). If three or more frames are not selected, the process is ended without performing sorting. If three or more frames are selected, a possible order in which the three or more frames are to be scanned is selected (step F202), and the total distance traveled by the carriage is calculated (step F203). It is then determined whether the calculated total distance is smallest (step F204). If the calculated total distance is smallest, the calculated value and the scanning order are stored (step F205). However, in the case in which the calculated total distance is not smallest, the process jumps to step F206.

In step F206, it is determined whether the total distance has been evaluated for all possible orders in which selected frames are to be scanned. If all possible orders have not been evaluated, the process returns to step F202 to select another possible order in which the selected frames are to be scanned.

If evaluation is completed for all possible scanning orders, the scanning order that results in the smallest total travel distance is employed as the scanning order in which to perform actual scanning.

Figure 10:
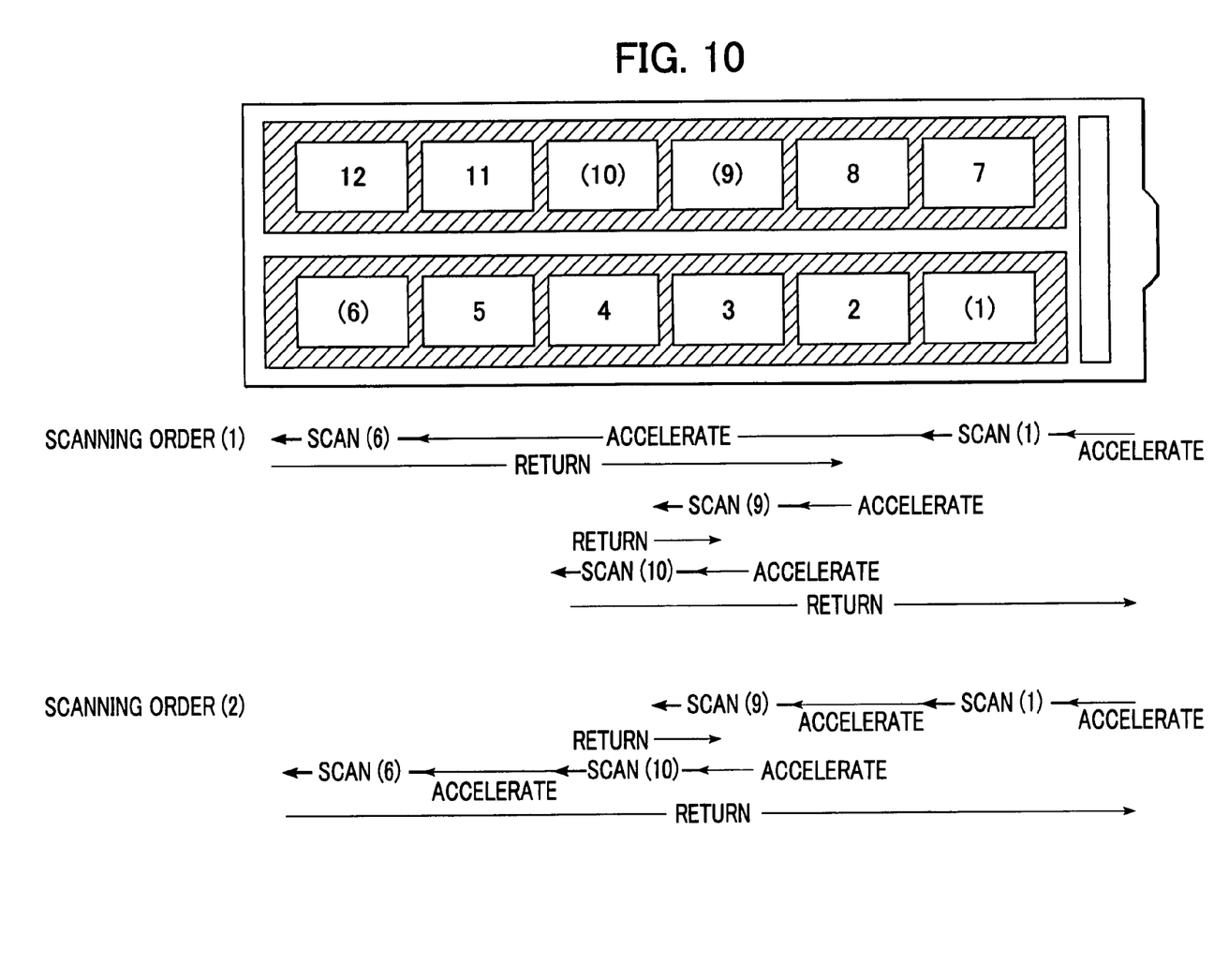
FIG. 10 is a diagram showing examples of orders in which a plurality of selected frames of a photographic film are scanned.

Referring to FIG. 10, specific examples of orders in which to scan a plurality of selected frames of a film are described. In FIG. 10, the sub-scanning direction is in the horizontal direction and the main scanning direction is in the vertical direction. In this example shown in FIG. 10, it is assumed that 1st, 6th, 9th and 10th frames are selected to be scanned.

In a first scanning order of 1st→6th→9th→10th frames, the total distance traveled by the carriage corresponds to 10 frames. In the case of a second scanning order of 1st→9th→10th→6th frames, the total distance traveled by the carriage corresponds to 6 frames, which is smaller by 4 frames than the total travel distance needed in the first scanning order. As can be understood from the above example, it is possible to determine a scanning order in which frames are scanned so that the total distance traveled by the carriage is minimized.

That is, in the present embodiment, the total distance traveled by the carriage is calculated for each of possible orders in which all selected frames are scanned, and the scanning order is determined so that the total distance traveled by the carriage is minimized.

Although in the embodiments described above, the photographic films are assumed to be of 35-mm type, the present invention can also be applied to films with other sizes such as a Brownie film, a 6×9 film, or a 6×12 film.

Other Embodiments

The objects of the present invention may also be achieved by supplying a software program code implementing the functions of any of the embodiments described above to a computer connected to a plurality of devices or to a computer in a system whereby the computer (a CPU or an MPU) in the system or the apparatus controls various devices in accordance with the program code.

In this case, it should be understood that the software program code implements the functions of the invention and thus the software program code falls within the scope of present invention. The program code may be transmitted on a carrier via a transmission medium (wireless or wired transmission medium such as an optical fiber) used in a computer network system (LAN, WAN such as the Internet, or wireless communication network system).

Means for supplying the program code to the computer, such as a storage medium on which the program code is stored, also falls within the scope of the present invention. Storage media which can be preferably employed in the present invention to store the program code include a floppy disk, hard disk, optical disk, magneto-optical disk, CD-ROM, magnetic tape, non-volatile memory card, and ROM.

Furthermore, the scope of the present invention includes not only such a system in which the functions of any embodiment described above is implemented simply by executing a program code on a computer but also a system in which the functions of any embodiment described above is implemented by the program code in cooperation with a OS (operating system) on which the program runs or in cooperation with another application software.

Furthermore, the program code may be stored in a memory provided on an expansion board inserted into the computer or an expansion unit connected to the computer, and a part or all of the process may be executed by a CPU or the like provided on the expansion board or the expansion unit thereby realizing the functions according to the invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image scanning apparatus comprising:
 a movable image sensing unit, which scans at least one document image arranged on a document plate, while moving in a sub-scanning direction relative to the at least one document image; and
 a controller that controls movement of said movable image sensing unit relative to the at least one document image in (i) the sub-scanning direction, and (ii) a direction opposite to the sub-scanning direction, said controller controlling movement of said movable image sensing unit such that when said movable image sensing unit scans plural document images arranged on the document plate, said controller moves said movable image sensing unit a predetermined distance in the direction opposite to the sub-scanning direction, after completion of said movable image sensing unit scanning one of the plural document images, and before said movable image sensing unit starts scanning of a next one of the plural document images,
 wherein said controller moves said movable image sensing unit in the direction opposite to the sub-scanning direction, when a predetermined distance is needed between the one document image and the next document image, in order to accelerate said movable image sensing unit to a scanning speed.

2. An image scanning apparatus according to claim 1, wherein said controller moves said movable image sensing unit in a direction opposite to a sub-scanning direction in a particular distance after the relative movement is temporarily stopped.

3. An image scanning apparatus according to claim 1, wherein the predetermined distance is calculated from at least one of a scanning speed, a scanning resolution, a space between documents in a sub-scanning direction, and a minimum distance needed to accelerate said movable image sensing unit to the scanning speed.

4. An image scanning apparatus according to claim 1, wherein said controller moves said movable image sensing unit to the home position when an operation mode requires that calibration data be acquired each time a document image is scanned.

5. An image scanning apparatus according to claim 1, wherein the document images are a plurality of frames of images formed on a photographic film.

6. A controller according to claim 1, wherein the predetermined distance is calculated by subtracting the Y coordinate of the leading edge of the next document from the current Y coordinate of the one document and then adding the distance needed to accelerate the movable image sensing unit to a scanning speed, wherein there is overlapping in the Y direction between the one document image and the next document image.

7. A controller according to claim 1, wherein the predetermined distance is calculated by subtracting the space between one document image and the next document image from the distance needed to accelerate the movable image sensing unit to a scanning speed, wherein there is no overlapping in location in the Y direction between the one document image and the next document image.

8. A control program stored on a computer-readable medium for controlling an image scanning apparatus to scan one or more document images arranged on a document plate while moving a movable image sensing unit in a sub-scanning direction relative to the document images, the control program comprising the step of:

controlling the relative movement of the movable image sensing unit such that the movable image sensing unit is moved a predetermined distance in a direction opposite to a sub-scanning direction after completion of scanning a first of the document images arranged on the document plate and before scanning a next of the document images, wherein the movable image sensing unit is moved in the direction opposite to the sub-scanning direction, when a predetermined distance is needed between the one document image and the next document image, in order to accelerate the image sensing unit to a scanning speed.

9. A scanning method comprising the steps of:

scanning a plurality of document images arranged on a document plate while moving a movable sensing unit in a sub-scanning direction relative to the plurality of document images; and controlling the relative movement of the movable image sensing unit such that the movable image sensing unit is moved a predetermined distance in a direction opposite to the sub-scanning direction after completion of scanning the first of the plurality of document images arranged on the document plate and before scanning the next of the plurality of document images, wherein the movable image sensing unit is moved in the direction opposite to the sub-scanning direction, when a predetermined distance is needed between the one document image and the next document image, in order to accelerate the image sensing unit to a scanning speed.

* * * * *